Figure 1:
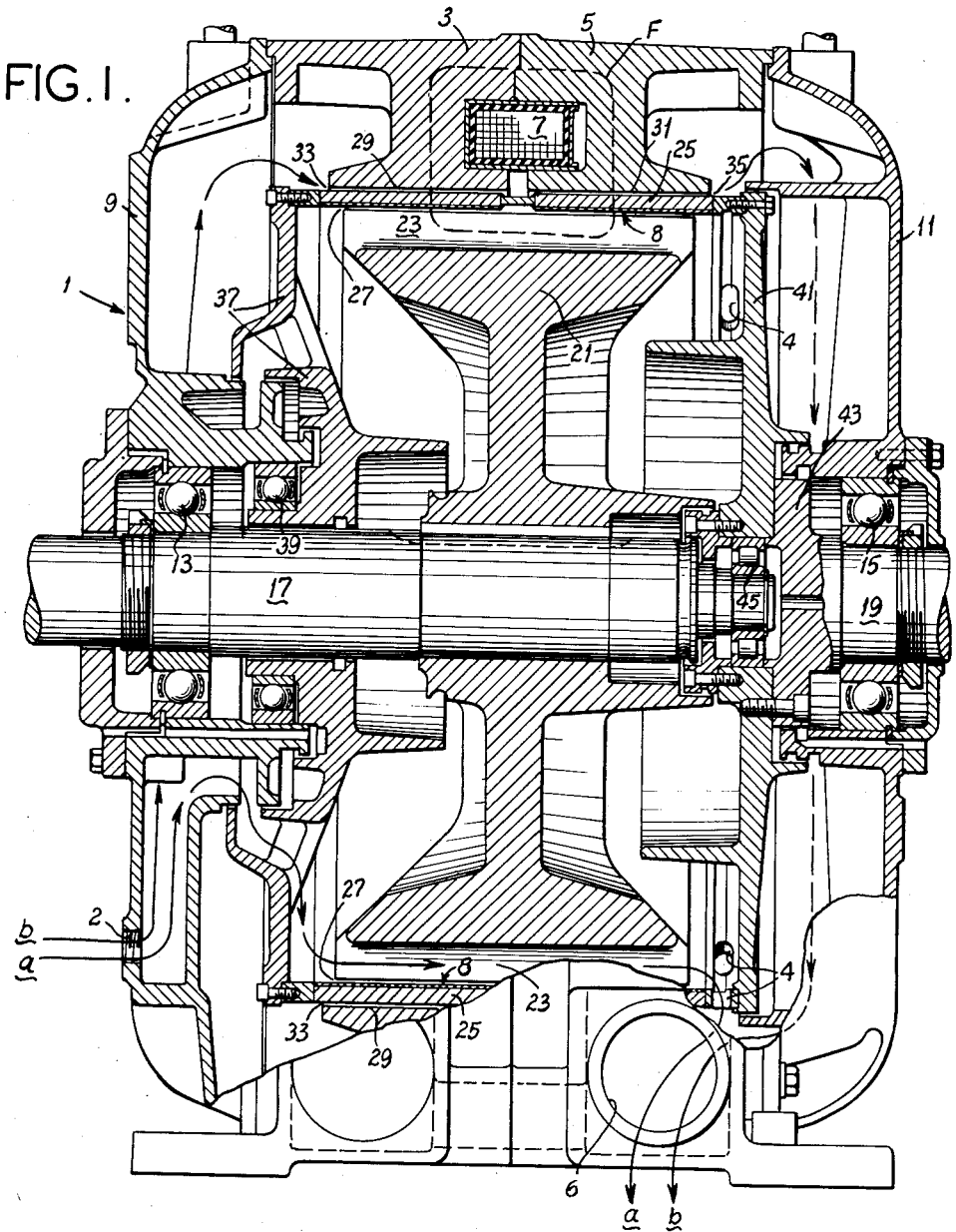

Feb. 7, 1961  R. L. JAESCHKE  2,971,105
EDDY-CURRENT MACHINE
Filed April 13, 1959  2 Sheets-Sheet 1

Ralph L. Jaeschke,
Inventor.
Koenig and Pope.
Attorneys.

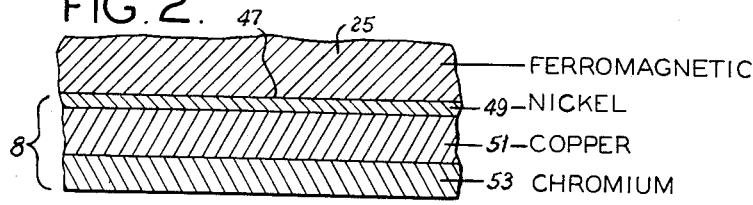
FIG. 2.
— FERROMAGNETIC
49 — NICKEL
51 — COPPER
53 — CHROMIUM
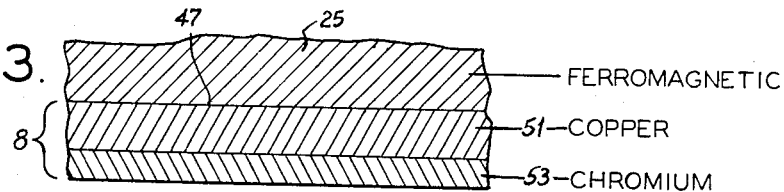
FIG. 3.
— FERROMAGNETIC
51 — COPPER
53 — CHROMIUM
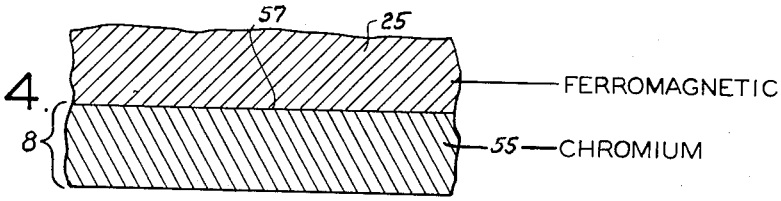
FIG. 4.
— FERROMAGNETIC
55 — CHROMIUM
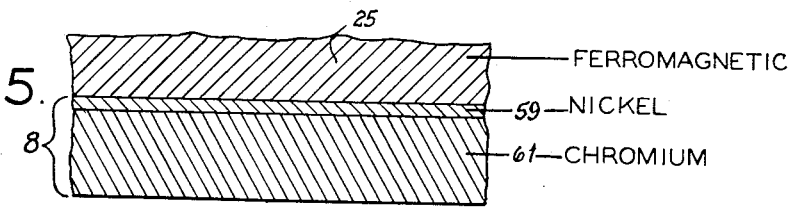
FIG. 5.
— FERROMAGNETIC
59 — NICKEL
61 — CHROMIUM
FIG. 6.
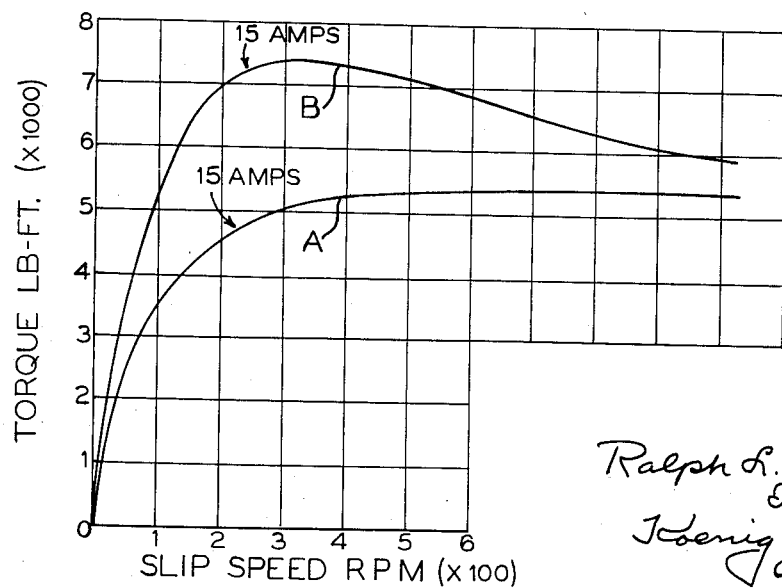
Ralph L. Jaeschke,
Inventor.
Koenig and Pope,
Attorneys.

United States Patent Office 2,971,105
Patented Feb. 7, 1961

2,971,105
EDDY-CURRENT MACHINE

Ralph L. Jaeschke, Kenosha, Wis., assignor to Eaton Manufacturing Company, Cleveland, Ohio, a corporation of Ohio Filed Apr. 13, 1959, Ser. No. 806,099

4 Claims. (Cl. 310—105)

This invention relates to improvements in eddy-current machines and more particularly to improvements in inductor members for such machines useful as couplings, brakes, dynamometers and the like.

Among the several objects of the invention may be noted the provision of an eddy-current machine adapted to transmit comparatively high torque at relatively low speeds by the use of comparatively high-conductive surfaces on the inductor members which face the magnetic poles of the machine; the provision of such surfaces which will avoid the wear, gouging, galling, chipping and the like which under certain conditions heretofore occurred on the surfaces formerly used for the purpose; and the provision of surfaces of the class described which have improved mechanical and electrical bonds with the inductor drum structures to which they are applied. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is an axial section showing a typical eddy-current machine to which the invention may be applied;

Figs. 2, 3, 4 and 5 are greatly enlarged fragmentary axial sections of inductor facings showing various forms of the invention; and Fig. 6 is a graph illustrating certain features of the invention.

Corresponding reference characters indicate corresponding parts throughout the several views of the drawings.

Referring now more particularly to Fig. 1, numeral 1 in general indicates an eddy-current slip coupling embodying the invention. This coupling is constituted by a casing formed of abutted pole rings 3 and 5 which support an annular field coil 7 and end bells 9 and 11. The end bells 9 and 11 respectively contain bearings 13 and 15 surrounding driving and driven shafts 17 and 19 as shown. Keyed to the drive shaft 17 is a magnetizable polar field member 21, supporting peripherally disposed and axially extending pole-forming teeth 23. These teeth or poles 23 face the inner surface of a ferromagnetic (iron or steel) drum 25 across a small gap 27 at their ends. The outside face portions of the drum 25 face continuous inner cylindrical surfaces 29 and 31 of the pole rings 3 and 5, across small gaps 33 and 35, respectively. The inside face portions of drum 25 are faced as shown at 8 with materials according to the invention and referred to below.

When the coil 7 is magnetized by applying current thereto, a toroidal magnetic flux field, exemplified at F, passes through the members 3, 5, 25 and 23, and in doing so crosses the gaps 27, 33 and 35. The distribution of flux in the gaps 33 and 35 is peripherally homogeneous, but in the gap 27 it is bunched or concentrated at intervals by the pole-forming teeth 23. Therefore, upon relative rotation of the pole member 21 and the drum 25, the sweeping action of the flux field concentrations will induce eddy currents in the drum 25. These in turn produce reactive magnetic fields with the fields from the poles 23, so as to effect a driving slip coupling therebetween.

The drum 25 is supported at one end upon a spider 37, carried upon bearings 39 in the end bell 9. The other end of the drum 25 is supported upon a disc 41 attached to a flange 43 of the driven shaft 19. The assembly of parts 19, 41 and 43 is carried upon a pilot bearing 45 disposed at the end of the drive shaft 17. Coolant such as water is supplied through an inlet 2, part of it progressing, as shown by the lower line of curved darts a—a in Fig. 1, through the drum 25, passing by poles 23, escaping through ports 4 and ultimately out of the casing 3, 5, 9, 11 through an outlet 6. It is this part of the coolant that is responsible for foreign particles sometimes entering the gap 27 and heretofore having caused damage to the inner lining of the drum 25 when, as was the practice, the inner face of this lining was composed of copper. Another part of the coolant, as illustrated by the upper line of curved darts b—b shown in Fig. 1, passes around the drum 25 through the end bell 11 and to outlet 6. Shaft seals such as shown, or the like, are provided for various bearings but require no detailed discussion, inasmuch as they are of known type and function.

The invention relates to the character of the inner face of the drum 25, which defines the outer part of the gap 27 opposite poles 23. Figs. 2–5 illustrate various forms of this face made according to the invention. Referring now more particularly to Fig. 2, there is shown at the top a greatly enlarged axial section of the drum 25. Its inner face is indicated at 47, upon which is applied in known manner an electroplated flashing 49 of nickel; for example, from .0001" to .0005" thick. Upon this flashing of nickel is electroplated a thicker layer of copper 51; for example, .004" to .015" thick. Upon the surface of the copper is electroplated a layer 53 of chromium; for example, from .0005" to .005" thick.

It has been known to employ a copper facing on an eddy-current inductor drum for increasing the torque transmitted at the lower values of slip between a pole member such as 21 and the drum such as 25. This is illustrated in the Fig. 6 graph, wherein torque in pounds feet is plotted against slip speed in r.p.m. for 15-ampere excitation of a coil such as 7. Curve A shows the action of a ferromagnetic drum such as 25 without the employment of any different facing adjacent the poles 23. Curve B shows the action of such a drum employing a copper facing, as was heretofore the practice. The graph illustrates how, in the case of a drum employing a copper facing, the torque transmitted at the lower slip speeds is increased. A purpose of the invention is to preserve this property of a copper liner without the disadvantages of copper. At higher slip speeds, not shown on the graph, the torques transmitted in either case become more nearly equalized. It will be appreciated that there is a substantial advantage in the ability to transmit the stated high torques at low slip speeds. The reason for this advantage of a copper liner is that eddy currents in a surface swept by polarized flux fields tend to be generated primarily near the surface facing the poles. Since copper has a higher conductivity than the ferromagnetic material constituting the drum 25, greater eddy currents are produced at lower slip speeds, which in turn produce stronger reactive flux fields.

The disadvantage of a copper facing is its softness.

Thus if any foreign particles enter at small gap 27, which is on the order of only .020" or so wide, they cause gouging, chipping, galling, scratching or the like. This results in the removal of some of the copper, which tends to roll up in balls and interfere with the operation of the machine. The action is particularly deleterious when, as shown, the rotary pole-forming member is inside the drum, since then the poles act in connection with the foreign particles like a hammer mill. By employing a chromium facing such as 53 over the copper facing such as 51 above described, there is obtained a hard surface which such particles are incapable of gouging, chipping, galling or scratching. Along with its hardness, chromium has a brittle property which, however, is not deleterious in the present application in view of the soft backing provided by the relatively soft copper 51. This minimizes chipping. While chromium does not have as low a specific resistance against current flow as copper, its resistance is considerably lower than that of iron and nickel. Thus there is preserved near the inner face of the drum 25 a material which is not only protective but is of relatively high electrical conductance. However, advantage is taken of the fact that copper is a better specific conductor than is chromium by making the thickness of the copper greater than that of the chromium, as indicated by the dimensions given above. Moreover, since nickel has the least conductance, its thickness is minimized as much as possible, which is to say that it is a mere flashing. Since nickel stands in the electromotive series between iron and copper, it reduces the electromotive potential across any interface between the layers of iron, nickel and copper. The result is comparatively less electrical corrosion than would be expected between a direct copper-to-iron bond.

In Fig. 3 is shown a form of the invention in which the nickel flashing 49 is omitted, like numerals designating like parts to those illustrated in Fig. 2. While the construction shown in Fig. 2 is preferred, that shown in Fig. 3 may be useful in some applications. Again in the case of Fig. 3, the thickness of the copper is on the order of .004" to .015" and the thickness of the chromium is on the order of .0005" to .005". As shown in Fig. 2, it is preferred that no nickel layer be employed between the copper layer 51 and the chromium layer 53 because the electromotive potential between chromium and copper is less than that between chromium and nickel. Thus the arrangement shown in Fig. 2 is optimum for the metals under consideration.

In Fig. 4 is shown a form of the invention in which both the nickel and copper layers are omitted from the surface of the inductor 25 and a thicker layer 55 of chromium is applied directly to the iron. This is also an advantageous form because of the relative closeness of chromium to iron in the electromotive series, which minimizes electrolytic corrosion between the two metals at the interface 57. However, while chromium has a substantial conductance, it is not as high as that of copper and therefore in this case the thickness of the layer of chromium is increased over the thicknesses shown in Figs. 2 and 3. In Fig. 4 the chromium layer is in the range of .007" to .008". Thus it will be seen that in this case the thickness of the layer of chromium is even greater than the thicknesses of the combined layers of copper and chromium shown in Figs. 2 and 3, so as to make up for the slight loss of specific conductivity of chromium as compared with that of copper.

In Fig. 5 is shown a form of the invention similar to that shown in Fig. 4 except that a flashing 59 of nickel is employed between a chromium layer 61 and the iron inductor 25. In this case the thickness of the chromium is again (as in the Fig. 4 form) .007" to .008", and the thickness of the flashing 59 is about .0001" to .0005". The purpose of the nickel in this case is to minimize electrolytic corrosion such as occurs between chromium and iron.

In view of the above, it will be seen that the invention provides for an inductor drum having a low resistance facing in which the flow of eddy currents is little resisted while at the same time providing a facing which will not become broken down as readily as formerly exposed copper facings.

When the drum 25 is thinly constructed, as shown in Fig. 1, it is preferable that it be composed of steel, but it will be understood that in some designs employing thicker drums ordinary iron may be employed for their construction. In any event, the drum should be ferromagnetic, and that term is intended herein to cover both steel and iron.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An eddy-current machine comprising a cylindrical ferromagnetic inductor drum member, a field member having circularly arranged poles facing a cylindrical wall of the drum member across a comparatively small gap, means adapted to establish a magnetic field interlinking said members, whereby concentrations of flux are adapted to be swept through the drum member to induce eddy currents at its surface adjacent said gap, said surface throughout the swept area being faced with a layer of copper covered by a layer of chromium adjacent the gap.

2. An eddy-current machine according to claim 1, wherein the copper layer ranges on the order of .004" to .015" thick and the chromium layer ranges on the order of .0005" to .005" thick.

3. An eddy-current machine comprising a cylindrical ferromagnetic inductor drum member, a field member inside of the inductor and having circularly arranged poles facing outwardly toward an inner cylindrical wall of the drum member across a comparatively small gap, means adapted to establish a magnetic field interlinking said member, said members being relatively rotatable, whereby concentrations of flux are adapted to be swept through the drum member to induce eddy currents at its surface adjacent said gap, said surface throughout the swept area being faced with a layer of copper, the latter being covered by a layer of chromium.

4. An eddy-current machine according to claim 3, wherein said copper layer is on the order of .004" to .015" thick and said chromium layer is on the order of .0005" to .005" thick.

References Cited in the file of this patent

UNITED STATES PATENTS

| | | |
|---|---|---|
| 2,871,383 | King | Jan. 27, 1959 |
| 2,906,208 | White | Sept. 29, 1959 |